Fig. I.

INVENTOR
WILHELM FRIEDRICH FUHRHOP,
HANS VAN ISSUM,
ATTORNEY

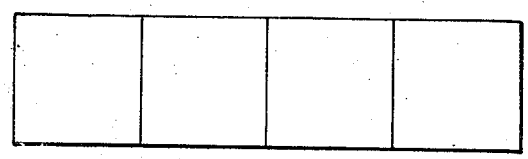
Fig. 8.
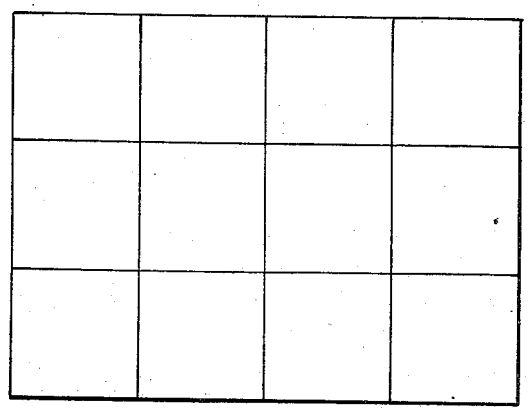
Fig. 9.
Fig. 10.
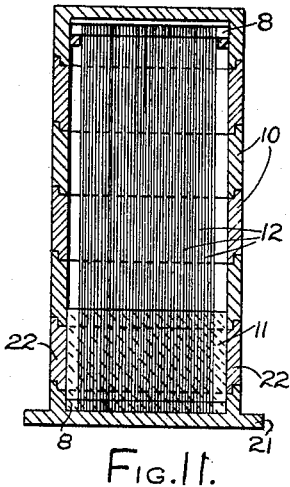
Fig. 11.
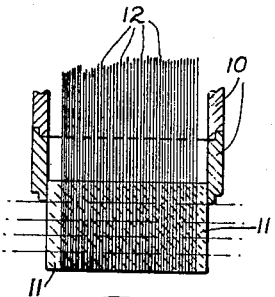
Fig. 12.
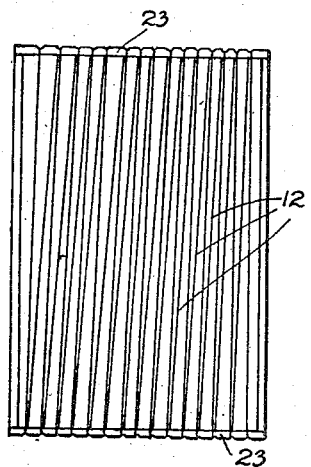
Fig. 14.
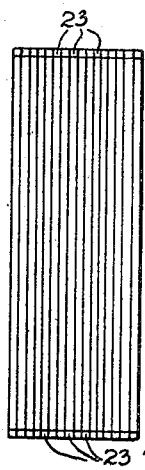
Fig. 15.
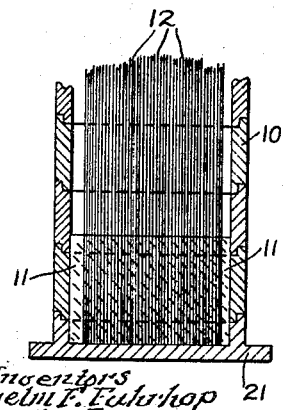
Fig. 13.
Inventors
Wilhelm F. Fuhrhop
Hans Van Issum

Patented July 25, 1950

2,516,559

UNITED STATES PATENT OFFICE 2,516,559

METHOD OF MAKING PILE FABRICS

Wilhelm Friedrich Fuhrhop and Hans Van Issum, London, England

Application January 23, 1946, Serial No. 642,958
In Great Britain March 1, 1945

7 Claims. (Cl. 154—78)

The invention relates to the manufacture of pile fabrics, such as those suitable for use as carpets, rugs, mats, plushes and similar articles, whether plain in the Jacquard fashion of two or more frames, in warp-printed or in other style.

The material used for the pile may be any yarn or filament of natural or artificial origin, undyed, dyed or printed, or mixtures of any of these according to the use to which the fabric is to be put and the term "yarn" as used hereinafter is to be considered in this general sense.

In the specification of the United States Patent No. 1,012,389, it has been suggested to manufacture such articles by forming a mass of threads which are arranged in more or less parallel formation, to compress the mass and then dip the compressed mass into water and to freeze it into a solid block which is then to be cut transversely into sections. The ice on one of the faces of each section is then to be melted to uncover a small portion of the length of threads to enable a fabric support to be secured to the exposed threads by means of glue, rubber solution, etc., the ice surrounding the upper portions of the threads being then melted and the product dried in readiness for any necessary finishing operation.

The present invention is an improvement and advance on the crude method above referred to and is distinguished from it in that in order to produce a pile fabric simulating a woven pile fabric, even if required with a determined pattern, the yarn threads are not merely arranged parallel, but are suspended (during consolidation into a block) in predetermined spaced relation so as to provide determined weftwise and warpwise density of the yarn threads in the sections to be cut from the block.

The consolidation of the suspended relatively spaced yarn threads is preferably effected by a medium which solidifies at normal temperature.

The product produced by the method according to the present invention not only simulates a woven pile fabric, but can be produced as economically and has such wearing and lasting qualities as to compete with the expensive woven pile fabrics hitherto manufactured.

The assembling of the yarn in closely arranged multi-linear formation with the yarn threads relatively spaced to suit determined weftwise and warpwise density may be effected in various ways, but to facilitate economic manufacture, shedding mechanism is advantageously employed, rods being inserted laterally above, below and between the shedded yarn so that it can be carried by the rods to conveyors or supports and arranged in the desired formation. By the use of creels with yarn of different colour or quality and of a Jacquard, Dobby or other suitable apparatus, a pattern running through the assemblage of yarn can be obtained.

In the accompanying drawings:

Figures 8, 9 and 10 are, respectively, a side view and plans illustrating the combining of sections of fabric.

Figures 11, 12 and 13 are sectional views illustrating a sectional mould and the use thereof in consolidating yarn in stages.

Figures 14 and 15 are, respectively, a side view and an end view of frames wound with yarn illustrating another method of assembling yarn.

In one method of assembling yarn into closely arranged multilinear formation, shedding apparatus controlled by Jacquard, Dobby or other like apparatus is used.

Figure 1:
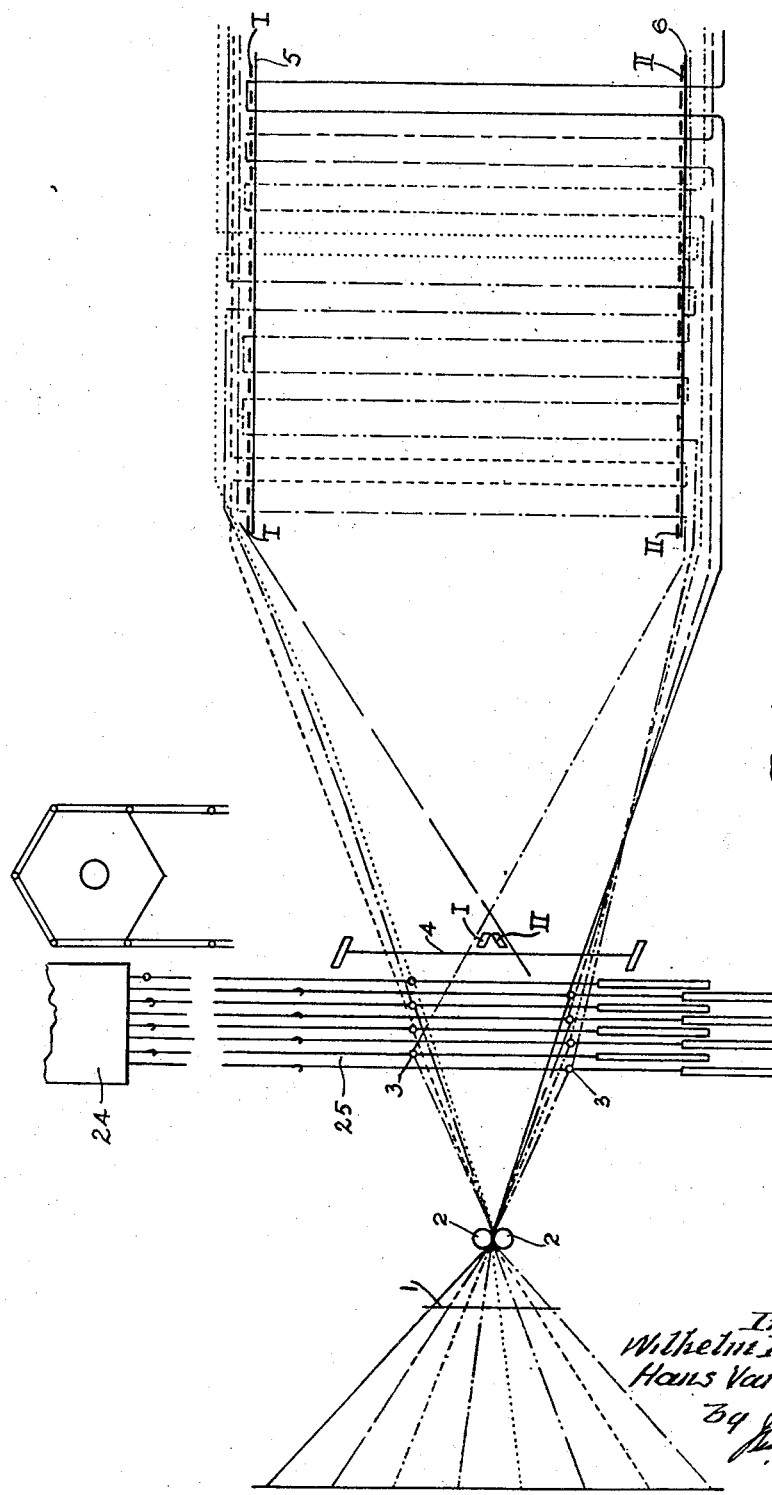
Fig. 1 is a diagram illustrating by way of example one method of assembling yarn by means of Jacquard control shedding mechanism.

This is somewhat diagrammatically illustrated in Figure 1, which is a side view, wherein 24 indicates a conventional Jacquard apparatus and 25 conventional shedding apparatus. It is to be assumed, in this example, that eight frames are used from a creel, that is, yarn of eight different colours is drawn from a creel. It passes through a reed 1, between rollers 2 through the healds 3 and an expansion reed 4 and is then transferred and arranged vertically as hereinafter explained by rods I and II which are moved to rails or conveyors 5 and 6.

As the yarn is shedded, two rods I and II are inserted laterally between the shedded yarn, one rod I being below the yarn it is to transfer and the other II above the yarn it is to transfer.

The inserted rods I and II are then moved by suitable means to the rails or conveyors 5 and 6, respectively, bringing and subtending the yarn with which they are engaged into vertical position in which the yarn is strung or subtended between two of the rods. The operations of shedding and transfer are then repeated.

As the rods I and II reach the rails or conveyors 5 and 6, they are moved periodically along them.

The rods may be simply moved along stationary rails, or conveyors with slots or clips to receive the rods may be used, the conveyors moving periodically as the rods are added to them.

Figure 2:
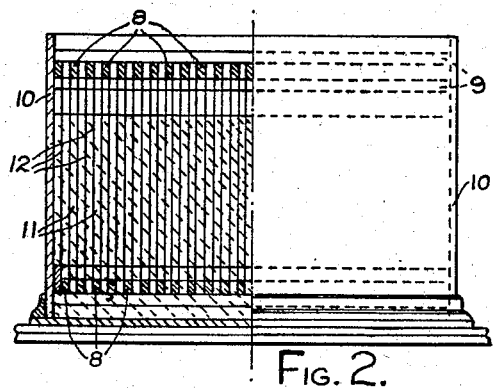
Figures 2, 3 and 4 are, respectively, a half-sectional side view, a plan and a half-sectional end view of a mould with assembled yarn in position and consolidated by a solidifying medium.
Figure 4:
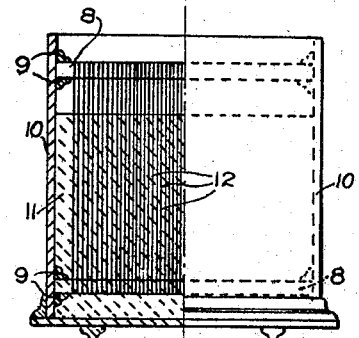
Figure 3:
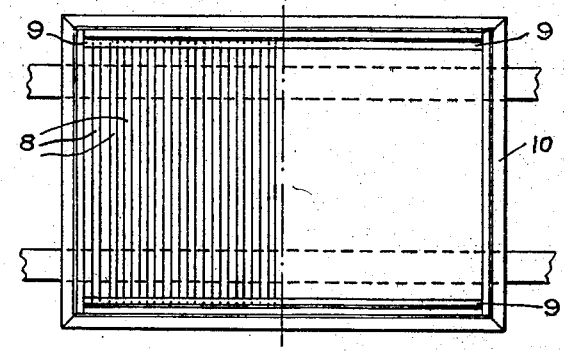

The rods with the yarn assembled on them are conveyed away and transferred to a mould for consolidation, for instance, they are arranged on supporting rails 9 in a mould 10, Figures 2 to 4, in which figures the rods are indicated by the reference numeral 8 and the yarn by 12.

The closely arranged multilinear assemblage of yarn thus obtained is consolidated by filling the mould, for instance, with a molten medium 11 which solidifies on cooling so that a solid block of consolidated yarn is obtained.

The block is cut transversely to the linear direction of the yarn into sections.

Figure 5:
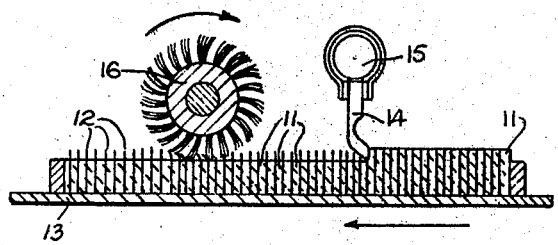
Figure 5 is a side sectional view illustrating the preparation of a section of consolidated yarn for the reception of a backing.

The sections are placed on a conveyor 13, Figure 5, and passed successively under a scraper 14 heated by a heating element 15, and under a revolving brush 16, so that a thin layer of the solid consolidating medium is removed to expose ends of the yarn.

Figure 6:
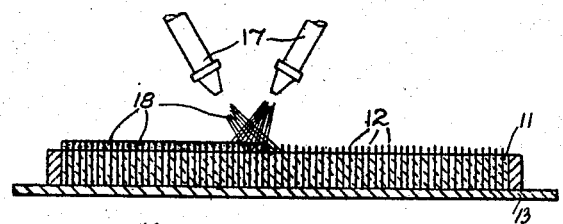
Figure 6 is a side sectional view illustrating the spraying of backing material to a section.

The sections are next conveyed below nozzles 17, Figure 6, which spray the exposed yarn ends with a plastic or other backing material 18, which hardens and toughens on cooling so that the yarn is fixed in the backing. A backing material of a pasty or powdered form may be used which is applied by spreading either with or without heat and may be hardened or set by pressure or rolling. A plastic sheet may be applied to the yarn ends and fixed by heating and/or pressure.

Figure 7:
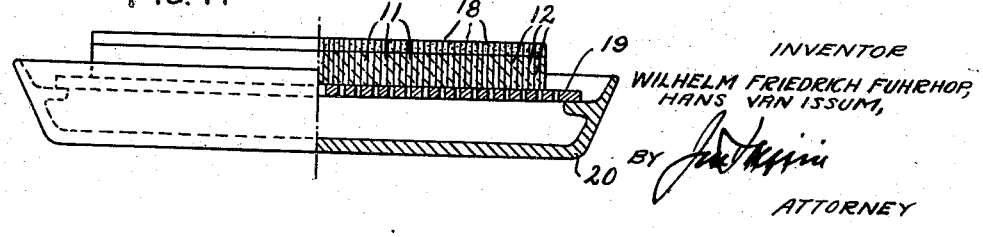
Figure 7 is a side view, half in section, illustrating the removal of the consolidating or solidifying material.

The sections are then placed on draining plates 19 in containers 20, Figure 7, which are suitably heated so that the solid consolidating medium melts and drains into the containers.

The containers may be travelled on a conveyor or the conveyor may be made to act as a draining plate and suitable means be provided to heat it and receive the removed medium.

The sections are removed from the draining plates and the removal of the medium from the yarn can be completed by brushing, and the clean yarn may be opened up by further brushing or combing.

The finished sections of fabric so produced may be combined to form a continuous length of fabric by arranging them as indicated in Figures 8 and 9, or as a carpet or rug as in Figure 10, the sections being united by a backing common to all the sections in the length or piece.

Instead of applying a backing to each section of consolidated material as described with reference to Figure 6, the sections may be arranged as indicated in Figures 9 and 10 and the backing applied over all of them before being passed over the draining plates for removal of the consolidating medium.

A sectional mould may be used and the medium be filled in layer by layer. For instance, a sectional mould 10, Figure 11, is provided with a removable bottom 21. Consolidating medium 11 is only poured into the mould to a level slightly above the first mould section 22. When the medium has solidified, the bottom 21 and first section 22 are removed to expose the greater part of the solidified layer. This is cut transversely, as indicated by the dot and dash lines is Figure 12, to produce consolidated sections of yarn which can be treated as hereinbefore described. The outer surface of an exposed layer may be scraped and brushed and provided with a backing before each section is cut off. The bottom 21 is replaced as in Figure 13, and more consolidating medium poured into the mould to form another layer and the process is repeated.

The mould may be advantageously turned into a horizontal position during the cutting of the transverse sections.

An alternative method of assembling the yarn consists in winding it on frames 23, Figure 14, the transverse bars of which may be grooved to determine the spacing of the yarn. A number of frames wound with yarn are packed together as in Figure 15. The pack of frames are set in a mould so that the yarn can be consolidated as hereinbefore described.

Examples of consolidating media which solidify on cooling are: liquid solidified by freezing, wax which is melted by heating and allowed to cool, and, similarly, a metal alloy of low melting point such as Wood's metal, which consists of:

50 pt. w. bismuth
    24 pt. w. lead
    14 pt. w. tin
    12 pt. w. cadmium

Examples of consolidating media which set or congeal and can be removed from the yarn by washing are: starch or gelatine solutions or gels.

Examples of backing material are plastics with or without fillers, for instance, a solution of thermoplastic material, which can be used as a backing or coating substance, applied by spraying or spreading, is compounded as follows:

10 pt. w. vinyl chloride acetate copolymer (30% vinyl chloride and 70% vinyl acetate)
2 pt. w. tributyl phosphate
88 pt. w. methyl ethyl ketone It is necessary, especially with artificial filaments, such as rayon, nylon and the like, that care must be taken to use a consolidating medium which will not have any deleterious effect, either physically or chemically, on the filament.

Examples of media suitable for consolidating such artificial filaments are: Gelatine, starch, rosin or animal or vegetable glue removed by heating and washing.

It will be understood that a canvas or other fabric backing, or cords or a mesh of yarn or other reinforcing material or flock may be used in addition to the plastic backing, or together with any other suitable fixative.

When a yarn surface is required on both sides of the fabric, two sections of consolidated yarn may be superposed and united by a fixative or backing material arranged between them.

Instead of the consolidating material being applied to the yarn in a mould, the yarn may be impregnated with a consolidating medium, for example, it may be sprayed with the medium while it is being assembled, the assembled impregnated yarn being subjected to pressure, if necessary, to complete the consolidation.

We claim:

1. The method of making a pile fabric having a texture simulating a woven pile fabric which comprises positioning yarn with the yarn threads spaced in accordance with predetermined weftwise and warpwise density, consolidating the spaced yarn in a mass by means of a gel, separating the consolidated mass transversely of the linear direction of the yarn into sections, removing part of the gel by heating and scraping and brushing one face of each section to expose the yarn ends, fixing the exposed yarn ends in a backing, and heating the remainder of the gel to remove it from the yarn.

2. The method of making a pile fabric having a texture simulating a woven pile fabric which comprises positioning yarn in such manner as to space the yarn threads in accordance with predetermined weftwise and warpwise density, consolidating the spaced yarn in a mass by means of a gel, separating the consolidated mass transversely of the linear direction of the yarn into sections, removing part of the gel by heating and scraping and brushing one face of each section to expose the yarn ends, fixing the exposed yarn ends in a backing of thermoplastic material, and removing the remainder of the gel from the yarn.

3. The method of manufacturing a pile fabric, which comprises subtending yarn so that the yarn threads assume predetermined weftwise and warpwise spacing, immersing the subtended yarn in a heated fluid which solidifies upon cooling at normal room temperature to form a solid block containing the yarn, cutting the block transversely of the linear direction of the yarn threads to divide the same into a plurality of sections of selected size, scraping part of the solidified mass from each section to expose yarn ends, applying to the scraped surface of the section a material which hardens on said surface and about the exposed yarn ends to form a backing, and removing the remainder of the solidifying medium from the yarn.

4. In a method for manufacturing a pile fabric wherein fibres are parallelly embedded as a unit in a consolidating medium and one surface of the medium is removed to expose the ends of the fibres so that they may be secured to a backing and the remainder of the medium removed therefrom the improvement comprising embedding the exposed ends of the fibres of a plurality of units in back to back relationship in a common backing layer.

5. In a method for manufacturing a pile fabric wherein fibres are parallelly embedded in a consolidating medium and one surface of the medium is removed to expose the ends of the fibres so that they may be secured to a backing, the improvement consisting in embedding the fibres in a consolidating medium comprising a gel.

6. The method of producing a pile fabric having a texture simulating woven pile fabric which comprises subtending yarn with the respective yarn threads relatively spaced in one direction to suit a predetermined weftwise density and also relatively spaced in another direction to suit a predetermined warpwise density, consolidating the subtended spaced yarn by means of a consolidating medium to fix the yarn in said spaced relation, dividing the consolidated mass transversely of the run of the yarn into a plurality of transversely separated sections, removing part of the consolidating medium from each section to expose yarn ends, fixing the exposed yarn ends in a backing and removing the remainder of the consolidating medium from the yarn of each section.

7. The method of producing pile fabrics which comprises drawing yarn from a source of supply, relatively spacing the yarn to provide weftwise spacing of predetermined density, shedding the yarn, subtending the shedded yarn in relatively spaced relation to provide predetermined warpwise density, consolidating the subtended spaced yarn by means of a consolidating medium to fix the yarn in said spaced relation, dividing the consolidated mass transversely of the run of the yarn to form a plurality of transversely separated sections, removing part of the consolidating medium from each section to expose the ends of the yarn, fixing the exposed yarn ends in a backing, and removing the remainder of the consolidating medium from the yarn.

WILHELM FRIEDRICH FUHRHOP.
HANS VAN ISSUM.

REFERENCES CITED

The following references are of record in the file of this patent:

UNITED STATES PATENTS

| Number | Name | Date |
|---|---|---|
| 7,403 | Taylor | May 28, 1850 |
| 648,567 | Keefer | May 1, 1900 |
| 1,012,389 | Marche | Dec. 19, 1911 |
| 1,047,822 | Marche | Dec. 17, 1912 |